United States Patent [19]

Yamada

[11] Patent Number: 4,605,957
[45] Date of Patent: Aug. 12, 1986

[54] MACHINE AND METHOD FOR PICTURE REPRODUCTION WITH STEADILY VARIABLE REPRODUCTION SCALE

[75] Inventor: Mitsuhiko Yamada, Kyoto, Japan

[73] Assignee: Dainippon Screen Seizo Kabushiki Kaisha, Kyoto, Japan

[21] Appl. No.: 417,437

[22] Filed: Sep. 13, 1982

Related U.S. Application Data

[63] Continuation of Ser. No. 170,127, Jul. 18, 1980, abandoned, which is a continuation of Ser. No. 933,714, Aug. 15, 1978, abandoned.

[30] Foreign Application Priority Data

Aug. 25, 1977 [JP] Japan ............................ 52-101976
Nov. 1, 1977 [JP] Japan ............................ 52-131366

[51] Int. Cl.$^4$ .............................................. H04M 1/06
[52] U.S. Cl. ....................................... 358/78; 358/77; 358/287
[58] Field of Search ............... 358/75, 77, 78, 80, 358/256, 260, 22, 280, 287, 160; 340/728, 731; 360/32; 178/30

[56] References Cited

U.S. PATENT DOCUMENTS

| 3,678,497 | 7/1972 | Watson et al. | 178/30 X |
| 3,878,559 | 4/1975 | Pugsley | 358/78 X |
| 3,895,375 | 7/1975 | Williams | 340/324 AD |
| 3,944,726 | 3/1976 | Ito | 358/78 |
| 3,991,868 | 11/1976 | Robinson et al. | 340/731 X |
| 4,107,786 | 8/1978 | Masaki et al. | 340/731 X |
| 4,129,860 | 12/1978 | Yonezawa et al. | 340/728 X |
| 4,134,128 | 1/1979 | Hurst | 358/160 |
| 4,135,212 | 1/1979 | Pugsley et al. | 358/285 X |
| 4,163,605 | 8/1979 | Yamada | 358/77 X |

Primary Examiner—Aristotelis M. Psitos
Attorney, Agent, or Firm—Lackenbach Siegel Marzullo Presta & Aronson

[57] ABSTRACT

A machine and method of picture reproduction wherein a picture on a first cylinder is scanned and the signals produced are color-corrected, digitalized, and fed into a memory. Then the stored values are read out from the memory at the same frequency as they were put in, and are converted to analog form and used to record a picture on a light-sensitive film mounted on a second cylinder. Magnification or reduction is provided by controlling the addresses of the read-out values so that some values are either read out several times, or skipped.

5 Claims, 16 Drawing Figures

MACHINE AND METHOD FOR PICTURE REPRODUCTION WITH STEADILY VARIABLE REPRODUCTION SCALE

This is a continuation, of application Ser. No. 170,127, filed July 18, 1980 now abandoned which in turn is a continuation of Ser. No. 933,714; filed Aug. 15, 1978 also abandoned.

This invention relates to a machine and a method of picture reproduction with steadily variable reproduction scale for a picture scanning and recording machine.

A picture scanning and recording machine sometimes takes the form of a color scanner, a facsimile reproducer, or the like. In machine of this type the original picture is mounted on an original picture cylinder which is rotated, and thus the original picture is scanned. A reproduction picture is recorded onto a piece of photosensitive material which is mounted on a second rotating cylinder, the recording picture cylinder. It is relatively easy to alter the scale in the direction of the axes of the cylinders by varying the speeds of the pick-up head which performs the scanning of the original picture and of the recording head which records the reproduction picture. However, it is not so easy to alter the scale, i.e. to provide magnification or reduction, in the direction of the circumference of the cylinders, and various means for solving this problem have been conceived.

In a first method, magnification is changed by using original picture cylinder and recording picture cylinders of different diameter. Both cylinders are rotated at the same speed. In this method, however, the ratio between the diameters of the two cylinders determines the magnification. Consequently, a different cylinder is required for each magnification factor. This means high cost, and the range of magnification factors is limited by the availability of cylinders.

In a second method magnification is changed by varying the relative rotation speeds of the two cylinders. In this case, since the magnification depends upon the ratio of the rotation speeds of the cylinders, this ratio must be varied continuously, in order to provide continuous variation of magnification. This requires a complicated mechanism. Further, when the magnification required is not an integer, it is necessary to delay the writing of the picture signals onto the reproduction picture for a time, in order to allow for correct synchronization.

In a third method, a picture cylinder and a recording cylinder of the same diameter are rotated at the same speed, and picture signals picked up by scanning the original picture attached to the picture signal are first stored in a memory and then are read out from the memory and used to record the picture on the recording cylinder. In this method magnification or reduction is accomplished by varying the frequency of the sampling pulses of the writing mode and the reading mode. The ratio of these frequences determines the degree of enlargement or shrinking. However, the disadvantage of this method is that since the frequency of the sampling pulses which cause the analog-digital converter to write into the memory may be increased to a high frequency in order to give high magnification, a special analog-digital converter and memory having wide frequency range and converting speed are required; and similarly for the digital-analog converter in the output stage. Also, when the magnification factor is unity, since writing and reading cannot be performed simultaneously, the pulses of one of these must be delayed, which is a further inconvenience.

It is an object of the present invention to provide a machine and a method for picture reproduction with essentially continuously variable reproduction scale for a picture scanning and recording machine, free from the above-outlined defects, which has a simple construction and is readily practicable.

According to the present invention, there is provided a picture reproducing method with variable reproduction scale, comprising scanning an original picture to obtain analog input picture signals, correcting color and tone of the picture, converting the analog input picture signals to digital input signals in an analog-digital converter in synchronization with first sampling pulses, writing the digital input signals into a memory in synchronization with second sampling pulses, into memory locations with consecutively increasing addresses, reading out stored values in the memory as digital output signals in synchronization with third sampling pulses, addressing the memory by using addressing signals, converting the digital output signals into analog output picture signals in a digital-analog converter in synchronization with fourth sampling pulses, and recording a reproduction picture from the analog output picture signals, wherein the first, second, third, and fourth sampling pulses are provided at the same frequency, but at possible differing phases, and the addressing signals address locations in the memory in a non-decreasing fashion, and either remain the same for at least two sampling pulse periods on at least one occasion so that at least one value in a memory location is read out at least twice as a digital output signal, or increase by at least two memory locations in at least one sampling pulse period so that at least one value in a memory location is skipped over and not read out as a digital output signal.

According to the present invention there is further provided a picture reproducing machine with variable reproduction scale, comprising an original picture cylinder on which an original picture may be mounted, a pick-up head which scans the original picture and generates analog input picture signals, an analog-digital converter which converts the analog input picture signals to digital input signals in synchronization with first sampling pulses, a memory into which the digital input signals are written in synchronization with second sampling pulses, a digital-analog converter, into which digital output signals which are read out from the memory in synchronization with third sampling pulses are fed, and in which they are converted into analog output picture signals in synchronization with fourth sampling pulses, said reading-out from the memory using addresses provided by addressing signals, a recording cylinder on which a recording film is mounted, a recording head which receives said analog output picture signals from said digital-analog converter and which records a reproduction picture onto the recording film, and an address signal generator which generates said addressing signals, said addressing signals addressing the memory in a non-decreasing fashion, and either remaining the same for at least two sampling pulse periods on at least one occasion during the scan so that at least one value in a memory location is read out at least twice as a digital output signal, or increase by at least two memory locations in at least one sampling pulse period so that at least one value in a memory location is skipped over and not read out as a digital output signal.

Particularly, according to the present invention the repeated reading out or the skipping of values in memory locations may be performed repeatedly during the reading-out process, and approximately regularly, so that the mean proportion of addresses repeated or skipped is approximately uniform during the entire reading-out process. It is also possible, and in a preferred embodiment is practiced, to perform the repeated reading out or skipping of memory locations in a recurring pattern which recurs once per every n.th memory location, where n is a fixed integer. In some cases this means that repeated reading out or skipping of one or more memory locations occurs once per every n memory locations, where n is a fixed integer. It is also envisaged according to the present invention to alter the scale of the reproduction picture across the scanning lines, so as to preserve its proportions.

In order that the present invention may be better understood, preferred embodiments will now be described with reference to the accompanying drawings, in which:

FIGS. 1, including (A)–(H) is a time chart showing an example of pulses and signals in the system, during an example of magnification and an example of reduction performed according to the present invention;

Figure 13:
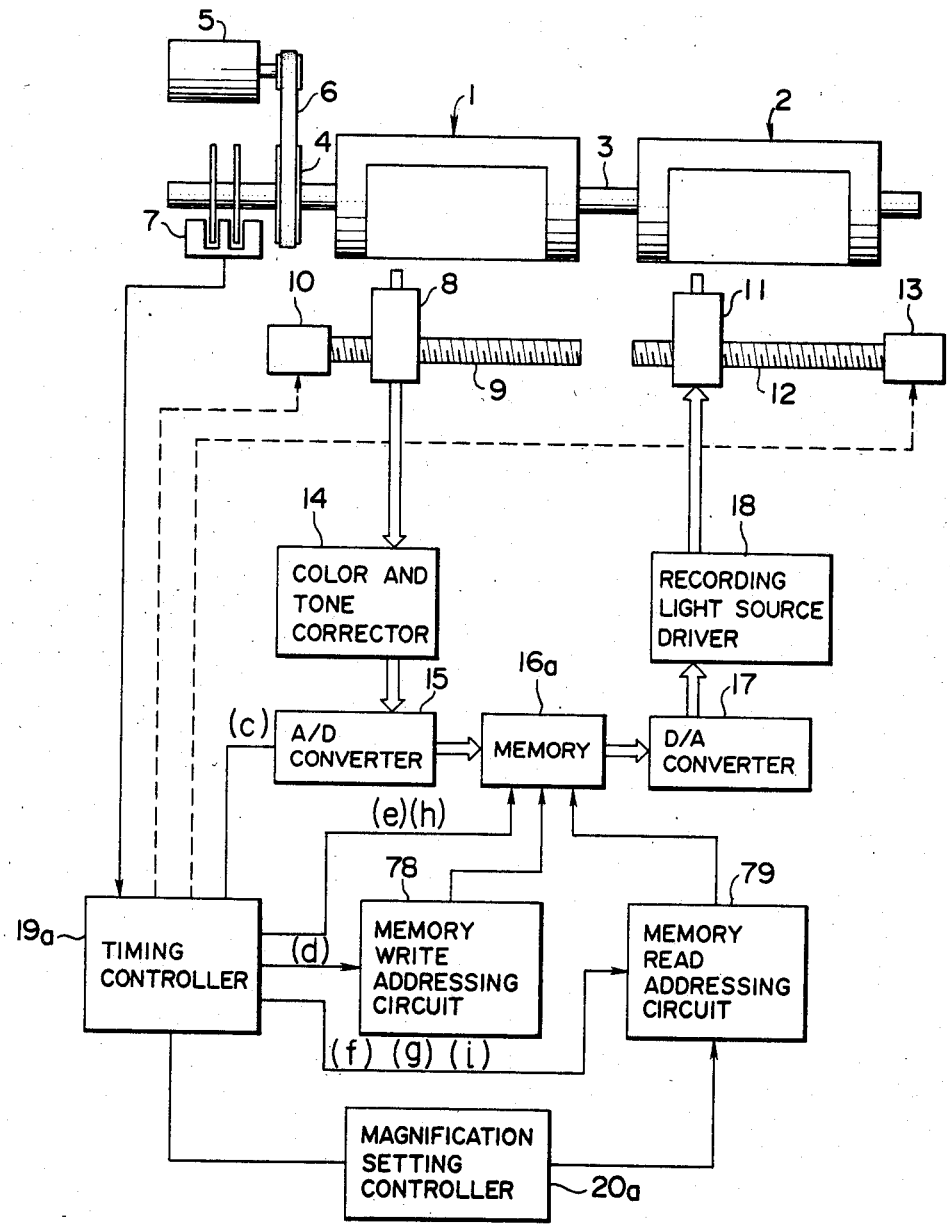
FIG. 13 is a block diagram of another embodiment of the present invention.
Figure 14:
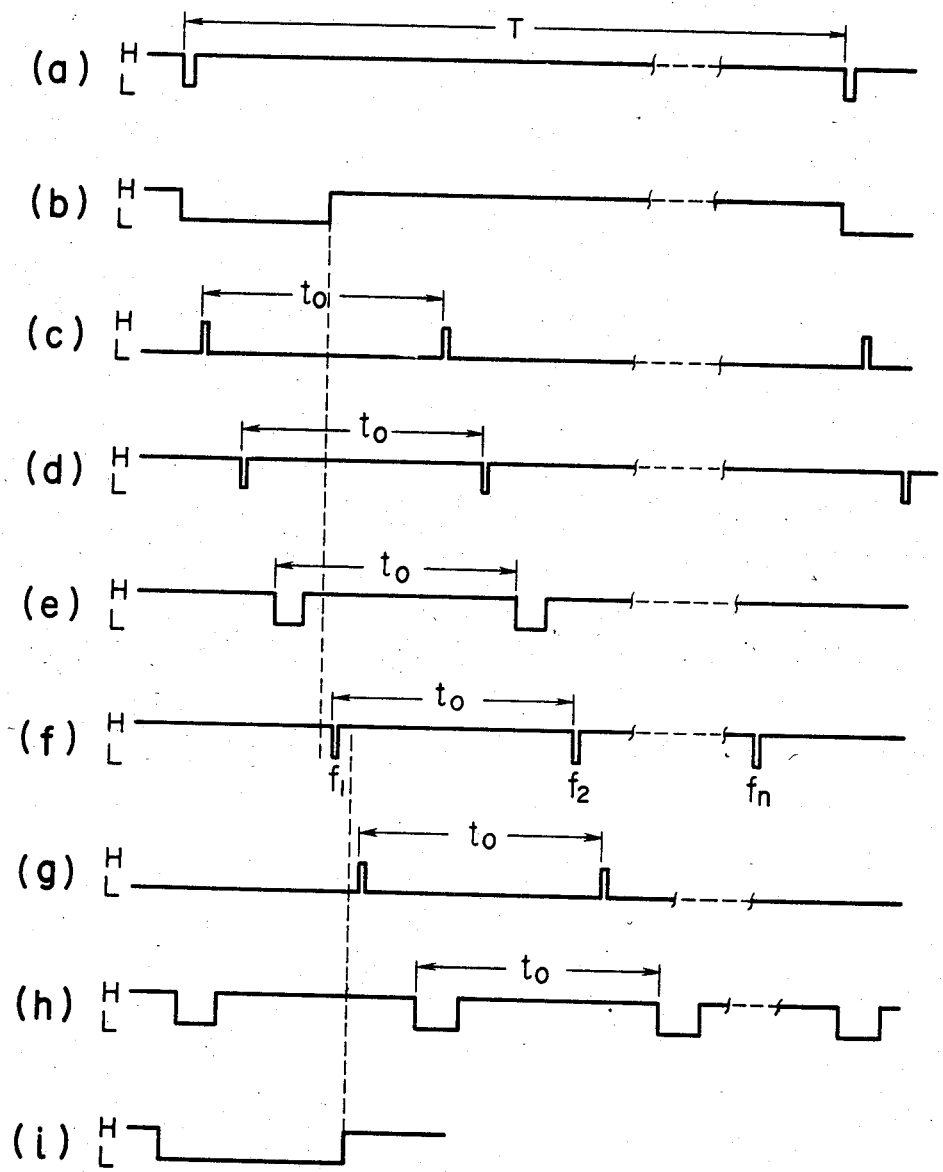
Figure 15:
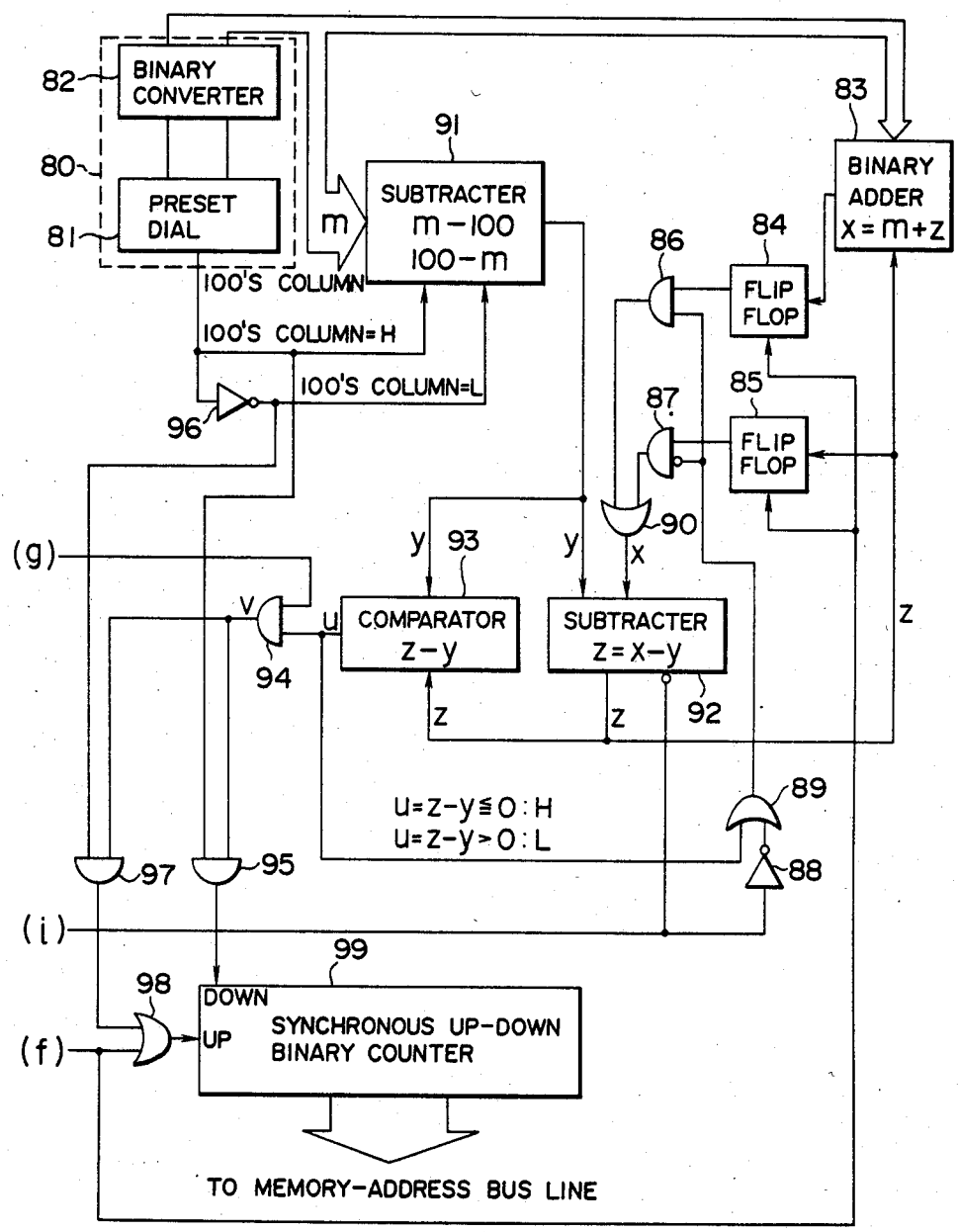
Figure 16:
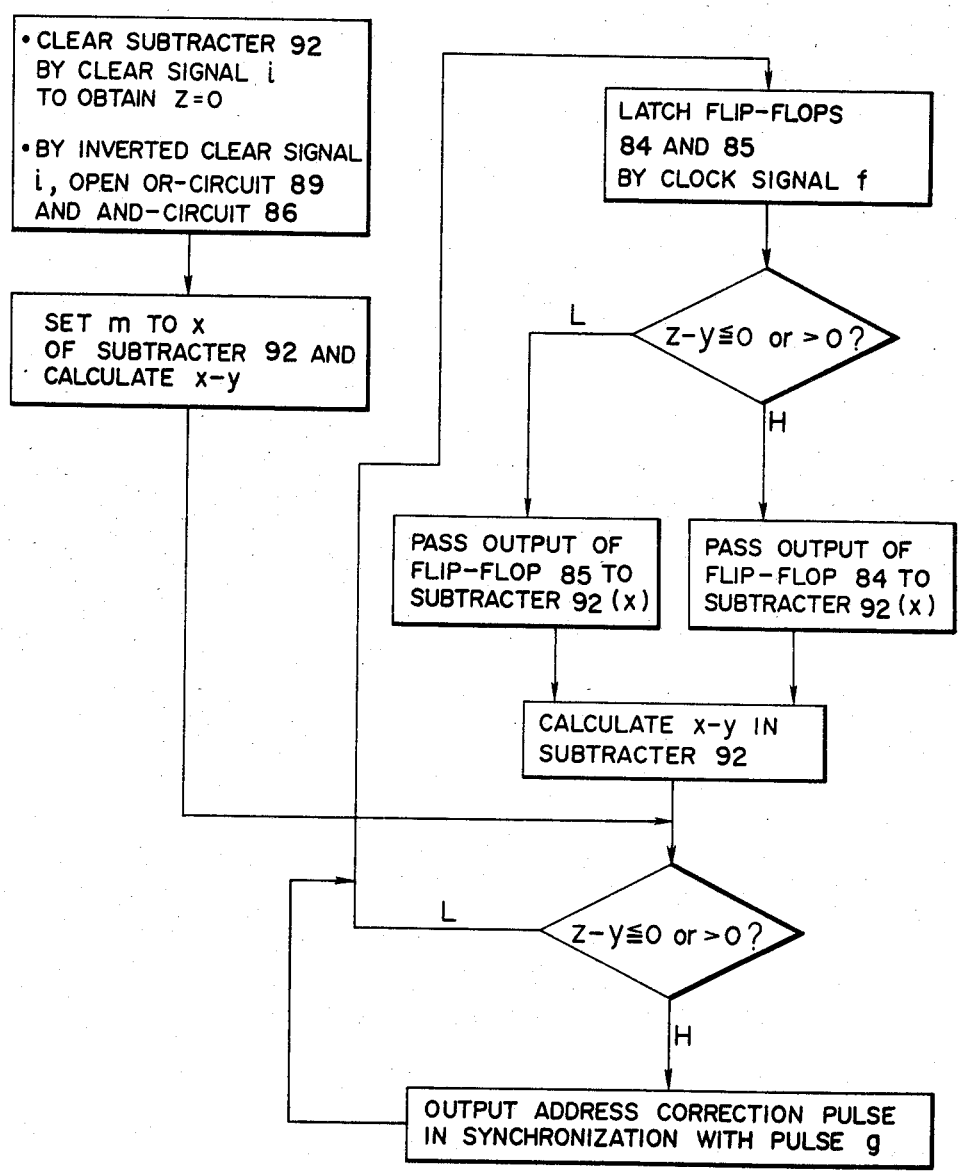

FIG. 14, including (a)–(h) and (j), is a time chart of sampling pulses output by a timing controller of the machine in FIG. 13;

FIG. 15 is a block diagram of a magnification setting controller and a memory read addressing circuit used in the machine of FIG. 13;

and FIG. 16 is a flow chart of operations of the machine of FIG. 13.

Figure 1:
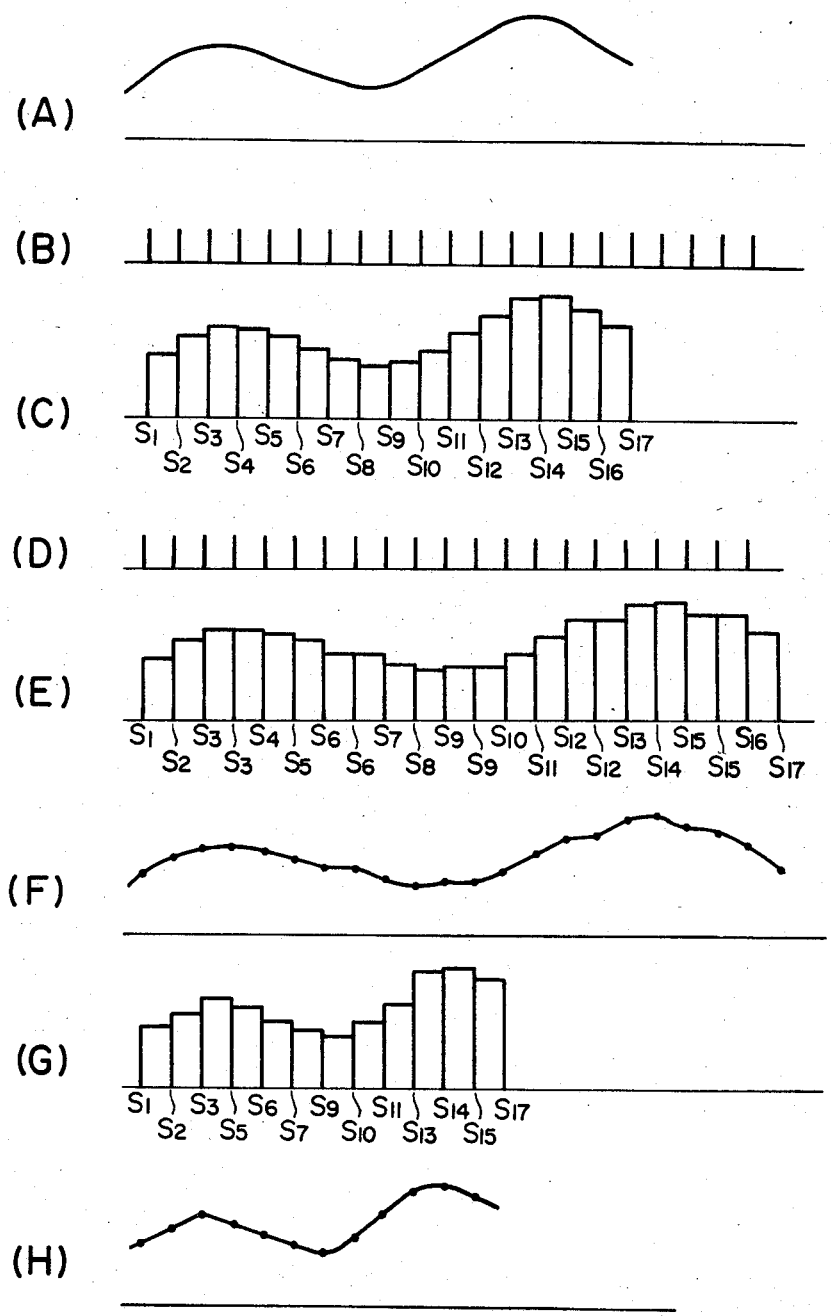

In FIG. 1 there is shown an example of the present invention, in which A shows a picture signal produced by scanning an original picture. This picture signal is analog, and is produced by a scanning head of conventional type. This picture signal A is sampled in synchronization with first sampling pulses B and is converted into a digital signal in an analog-digital converter, hereinafter referred to as the A/D converter. These digital signals are then stored in a memory. C shows schematically the values of the memorized signal in the memory. The symbols $s_1$, $s_2$, etc. refer to addresses in the memory, which is of a conventional type well known in the art. Clock signals for writing the digital signals in the memory, called second sampling pulses, are of the same frequency as the first sampling pulses, but usually of a different phase.

Third sampling pulses are used to read out the memorized signal from the memory, as shown in D. These are of the same frequency as the second and first sampling pulses, but usually of a different phase. The memory output signal, which will be herein called the digital output signal, is fed into a digital-analog converter which will be herein called the D/A converter, and there, in synchronization with fourth sampling pulses, it is converted into an analog output picture signal which is used for recording a reproduction picture on a recording film attached to a revolving recording cylinder by a recording head of conventional type. The fourth sampling pulses are of the same frequency as the first, second, and third sampling pulses, but again usually are of different phase.

It will be apparent that if the addresses in the memory which are referred to when reading out the digital output signals from the memory increase consecutively steadily, as do the addresses written into in synchronization with the second sampling pulses, then, with an original picture cylinder carrying the original picture which is the same size as the output picture cylinder and rotates at the same speed as it, a reproduction picture having the same scale as the original picture is obtained. That is, magnification is unity. However, as discussed above, prior art methods for arranging for magnifications both greater and less than unity have been lacking in various respects.

According to the present invention the addresses in the memory which are referred to when reading out the digital output signals do not increase consecutively and steadily. Instead addressing signals are provided which address the memory in a non-decreasing manner; that is to say, at no time do the addresses decrease. However, in the case of magnification greater than unity some of the addresses supplied are the same as their predecessors, thus causing the same memory location to be sampled twice or more, while in the case of magnification less than unity some of the addresses supplied are greater than their predecessors by more than one memory address step, thus causing one or more memory location to be skipped so that its value is not read out.

An example of the enlarging case, i.e. of a magnification greater than unity, is shown in E of FIG. 1, in which the addresses $s_3$, $s_6$, $s_9$, $s_{12}$, $s_{15}$ . . . are each read out one extra time, according to particular addressing signals. The digital picture output signal read out is converted to an analog picture output signal by the D/A converter, which signal is shown in graph F. It will be seen that graph F is similar to graph A, but is enlarged lengthwise by approximately 1.33 times.

An example of the reducing case, i.e. of a magnification less than unity, is shown in G of FIG. 1, in which the addresses $s_4$, $s_8$, $s_{12}$, $s_{16}$, . . . are skipped over, according to particular addressing signals which increase by two memory locations from $s_3$ to $s_5$, etc . . . so as to omit these addresses. The analog picture output signal obtained is illustrated in graph H. It will be seen that H is similar to graph A, but contracted lengthwise by a factor of 0.75.

Figure 2:
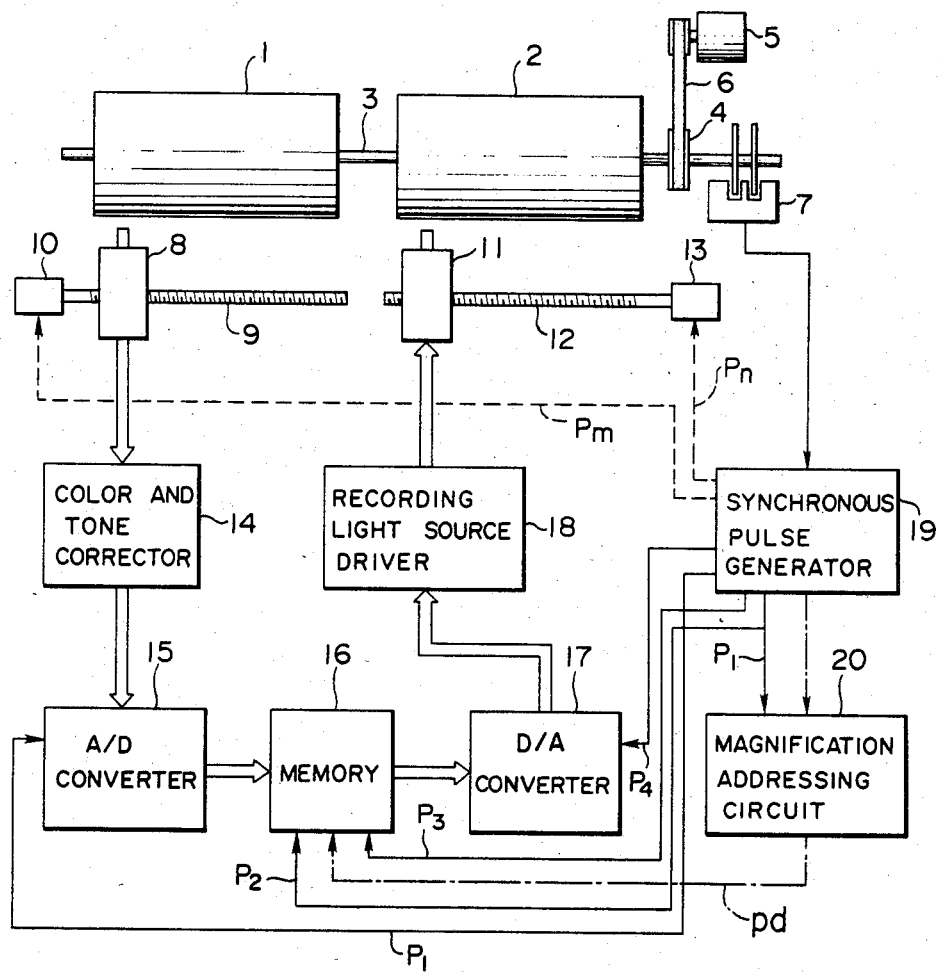
FIG. 2 is a block diagram of one embodiment of the present invention.

In FIG. 2 there is shown one embodiment of a picture reproducing machine with variable reproduction scale according to the present invention. In this figure, double solid lines indicate the flow of picture signals, solid lines indicate the flow of sampling pulses, one-dotted lines indicate the flow of addressing signals to the memory, and broken lines indicate the flow of control signals for driving motors for the two heads.

An original picture cylinder 1 and a recording cylinder 2 having the same diameter are mounted on a common shaft 3. The two cylinders 1 and 2 are rotated synchronously by a cylinder drive motor 5 through a pulley 4 mounted on the shaft 3 and via a belt 6.

A rotary encoder 7 is disposed on the shaft 3 and comprises a timing pulse generator which generates a plurality of timing pulses which divide one revolution cycle period of the cylinder into equal parts, and a rotation-synchronization pulse generator, which generates two rotation-synchronization pulses per one revolution of the cylinder, each rotation-synchronization pulse occurring half a revolution after the one before.

A pickup head 8 and a recording head 11 are disposed beside the picture cylinder 1 and the recording cylinder 2, respectively. The pickup head 8 is moved along a feed screw 9 which is positioned parallel to the shaft 3 by rotating the feed screw 9 by a motor 10. The recording head 11 is moved along a feed screw 12 which is positioned parallel to the shaft 3 by rotating the feed screw 12 by a motor 13. The motors 10 and 13 are rotated at speeds in proportion to the frequencies of the control signals $P_m$ and $P_n$ coming from a synchronous pulse generator 19 which receives pulses from the pulse encoder 7 and generates control pulse signals. The pickup head 8 and the recording head 11 are thus moved at speeds the ratio of which is equal to the frequency ratio of the two signals. This of course will be set to the desired magnification scale. If it differs from the magnification being provided in the circumferential direction of the cylinder, an anamorphous reproduction distorted in one direction may be obtained.

The pickup head 8 has a similar construction to the well-known one used in a plate-making color scanner, and includes color separation filters, photo-electric converters, and so forth. The pickup head 8 receives light from the original picture attached on the picture cylinder 1 and outputs color separation picture signals, such as red, green, and blue color separation signals, corresponding to the color tones and densities on the original picture. These picture signals are corrected in a color and tone corrector 14. This color and tone corrector is a conventional one as used in an electronic color separation scanner of a plate-making color scanner, a color facsimile producer, or the like. Detailed explanation of the pickup head and the color and tone corrector will be omitted here, as they are well-known in the art.

The output signals from the color and tone corrector 14, the input analog picture signals, are fed into the A/D converter 15, and are converted there into digital picture signals in synchronism with first sampling pulses $P_1$ from the synchronous pulse generator 19. These digital picture input signals are then fed into the memory 16 and are stored there in successively increasing memory locations by addressing in synchronization with second sampling pulses $P_2$ from the synchronous pulse generator 19.

The picture signals stored in the memory 16 are then read out by addressing in synchronization with third sampling pulses $P_3$ from the synchronous pulse generator 19. Addresses for this reading-out process are provided by addressing signals Pd generated by a magnification addressing circuit 20. These output digital picture signals which have been read out are then sent to the D/A converter 17 where they are converted into analog output picture signals in synchronization with fourth sampling pulses $P_4$ from the synchronous pulse generator 19. Then these analog output picture signals are fed into a recording light source driver 18, and control the amount and color of light from this light source which shines on the recording film attached to the recording cylinder 2. The light source 18 is of a conventional type well known in the art, and detailed explanation of it will be omitted.

According to the particular feature of the present invention, when the picture signals are written into the memory 16 they are written in consecutively increasing memory locations. However, when they are being read out from the memory, the addresses provided include either some repetitions or some omissions. Thus an enlarged, or alternatively a reduced, picture is obtained on the recording cylinder. To be accurate, the addressing signals Pd address the memory in a non-decreasing fashion, but either at least once they remain the same for at least two sampling pulse periods so that at least one value in the memory is read out at least twice—this gives the enlarging case—or alternatively at least once the addressing signals increase by at least two memory locations, so that at least one value stored in the memory is skipped over—thus giving the reducing case.

Figure 3:
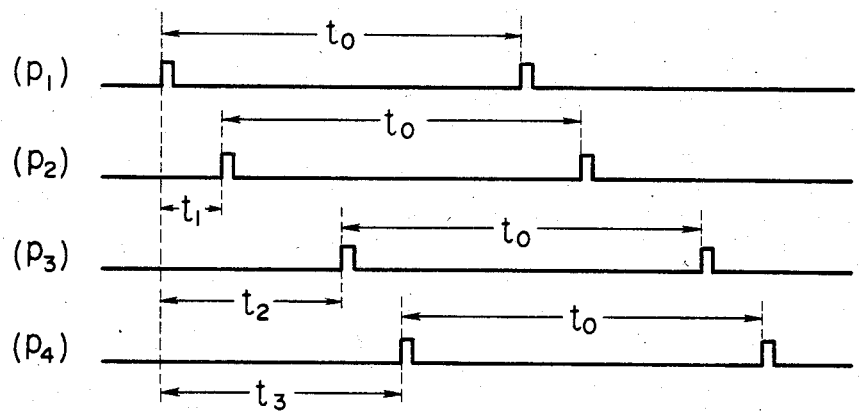
FIG. 3 is a time chart of sampling pulses in the embodiment shown in FIG. 2.

In FIG. 3 is shown a time chart showing the relation of the four sampling pulses $P_1$–$P_4$, each of which has the same unit period $t_o$. These sampling pulses are respectively the A/D converter order pulse, the memory write order pulse, the memory read order pulse, and the D/A converter order pulse. Although each occurs at the same frequency in time, they are offset from one another in phase. Thus each of these pulses $P_1$–$P_4$ comes later than the one before. This is in order to allow for the access times required by the converters, and in order to allow for the fact that it is not possible to write into and read from the memory at the same time.

Figure 4:
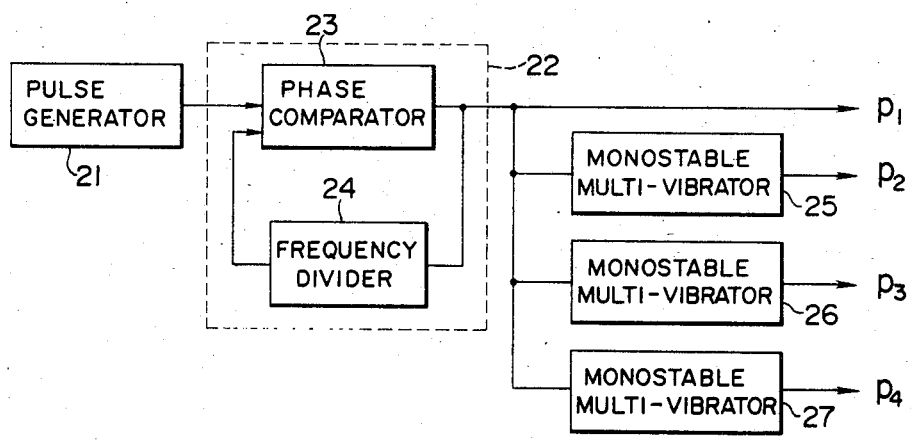
FIG. 4 is a block diagram of a pulse generating circuit for generating the sampling pulses of FIG. 3.

In FIG. 4 there is shown one embodiment of a pulse generating circuit, such as 19 in FIG. 2, for generating the four sampling pulses $P_1$–$P_4$. The timing pulse generator 21 of the rotary encoder 7 generates a stream of timing pulses. These are converted into pulse signals having the desired sampling period in a phase lock loop circuit 22 comprising a phase comparator 23 and a frequency divider 24. The pulse signals from the phase lock loop circuit 22 are divided into four, and one of them is output as the sampling pulse $P_1$. Each of the other three is sent to a corresponding monostable multivibrator 25, 26, or 27 and is delayed by its time of $t_1$, $t_2$, or $t_3$ respectively, as illustrated in FIG. 3. Then these monostable multi-vibrators output the sampling pulses $P_2$, $P_3$, and $P_4$ respectively.

Figure 5:
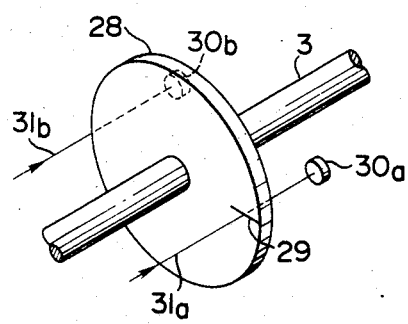
FIG. 5 is a perspective view of a pulse generator for generating a rotation-synchronization pulse, used in the machine of FIG. 2.

In FIG. 5 there is shown the rotation-synchronization pulse generator of the rotary encoder 7, which comprises a transparent circular plate 28 which is mounted on the shaft 3 and which includes an opaque line 29 radially extending in its periphery and a pair of photocells 30a and 30b positioned on opposite sides of the shaft 3, which receive a pair of light beams 31a and 31b which are emitted by means not shown in the figures in a direction parallel to the shaft 3 through the transparent plate 28. Thus when this plate is rotated together with the cylinders by the shaft 3 a pair of rotation-synchronization pulses Pa and Pb having phase difference of 180° are generated at the photocells 30a and 30b, one pulse being emitted by each photocell per each revolution of the cylinders. The reason for generating a pair of rotation-synchronization pulses 180° apart is that in order to save memory capacity the timings of the writing and the reading of the picture signals in the memory are half a rotation period apart. This will be described later.

In FIGS. 6, 7, 8, and 9, there are shown block diagrams and examples of pulses in the magnification addressing circuit of FIG. 2, which practices the present invention by either addressing repeatedly or alternatively skipping some addresses in the memory when reading out.

Figure 6:
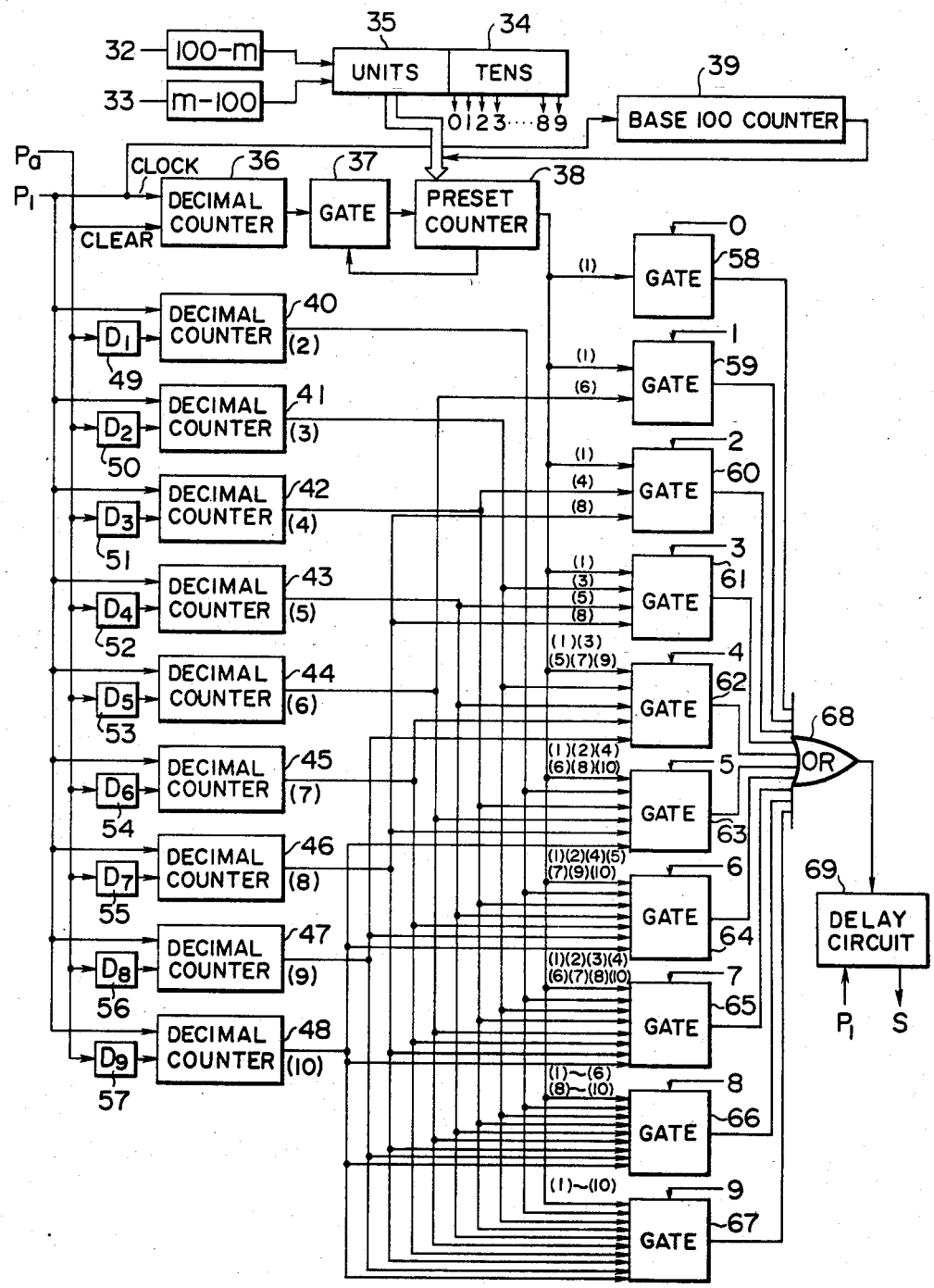
FIG. 6 is a block diagram of a magnification addressing circuit used in the machine of FIG. 2.

In FIG. 6 there are shown magnification set means 32 and 33 for reduced and enlarged scale, respectively. Here the magnification required is set in decimally. When enlarged magnification is required, a decimal number m larger than 100 is set on the magnification set means 33, and an integer n is calculated by the formula n=100 (m−100)/m. When the magnification is to be less than unity, i.e. in the reducing case, a decimal number m smaller than 100 is set on the reduced magnification set means 32, and an integer n is calculated by the formula n=100 (100−m)/m. n is rounded off to be an integer, and will of course be an integer of two digits, which we will call $n_1$ and $n_2$. Thus $n = 10\,n_1 + n_2$.

The number $n_1$ of tens is sent to a gate signal generator 34, which generates a gate signal [0] to [9]. The number $n_2$ of units is converted into binary code in an A/D converter 35, and this binary code is sent to a preset counter 38 where it is preset.

The sampling pulse $P_1$ is used as a clock pulse and is input to ten decimal counters 36 and 40–48, and to a base-100 counter 39. Each decimal counter outputs one pulse per ten clock pulses input. The base-100 counter 39 outputs one pulse per one hundred pulses input.

The decimal counter 36 is cleared by the rotation-synchronization pulse Pa from the rotary encoder 7, and then generates one pulse per ten clock pulses input. The pulse generated from the decimal counter 36 is sent to the preset counter 38 through a gate 37. As described above, a unit number $n_2$ has been preset in the preset counter 38, and the preset counter 38 outputs one pulse every pulse input from the decimal counter 36 and counts the number of pulses input. When the preset counter 38 has counted the same number as the number of units $n_2$ it sends a signal to the gate 37 to close it.

The output signal of the base-100 counter 39 is input to the preset counter 38 as a reset signal, which resets the units number $n_2$ again in the preset counter 38, thereby opening the gate 37. Then the output pulse from the decimal counter 36 can again reach the preset counter 38. In other words, per one hundred clock pulses $P_1$, $n_2$ pulses are input to and output from the preset counter 38.

Figure 7:
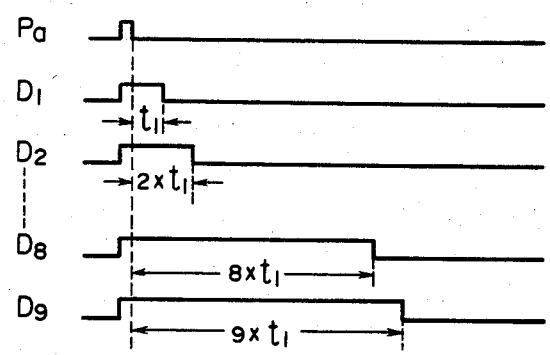
FIG. 7 is a time chart of delay amounts of rotation-synchronization pulses.

The clock pulse $P_1$, is input to the decimal counters 40–48, in parallel. The rotation-synchronization pulse Pa is fed to the decimal counters 40–48 as a clear signal through monostable multi-vibrators 49–57, which have different time constants from one another. As shown in FIG. 7, these monostable multi-vibrators delay the rotation-synchronization pulse Pa by time periods of $t_1 - 9 \times t_1$ respectively, and output their clearing signals to the decimal counters 40–48. Consequently, each of the decimal counters 40–48 outputs one pulse having the same delay time period as that of the clear signals per ten clock pulses input.

The outputs of the preset counter 38 and of the nine decimal counters 40–48 are sent to ten gates 58–67 with the predetermined combinations shown in FIG. 6. One of the gates 58–67 opens and passes its input signals according to the tens number $n_1$ selected from the possible outputs [0]–[9] of the gate signal generator 34 which controls them.

Output (1) of the preset counter 38 inputs to all ten gates 58–67. The outputs (2) to (10) of the decimal counters 40–48 input to the gates 58–67 as illustrated in FIG. 6, or as summarized in Table 1a. Table 1b, which is the inverse of Table 1a, tabulates, for each gate 58–67, which outputs (2) to (10) are fed into it. It will of course be understood that this set of combinations is only one particular example of the invention, and other combinations would work well. The outputs (1) to (10), as distributed according to Tables 1a and 1b, are so distributed that the distortion of reproduction may be minimized. That is to say, the addresses repeated or skipped are approximately uniformly distributed over the length of the scanning line. Other arrangements, in other embodiments, would be able to provide the same effect.

TABLE 1a

| Output | Dec. Counter | Input to Gates |
|---|---|---|
| 1 | 38 | 58–67 |
| 2 | 40 | 63–67 |
| 3 | 41 | 62, 65–67 |
| 4 | 42 | 60, 63–67 |
| 5 | 43 | 61, 64, 66, 67 |
| 6 | 44 | 59, 63, 65–67 |
| 7 | 45 | 62, 64–67 |
| 8 | 46 | 60, 61, 63, 65–67 |
| 9 | 47 | 62, 64, 66, 67 |
| 10 | 48 | 63–67 |

TABLE 1b

| Tens No. | Gate | Inputs | No. |
|---|---|---|---|
| 0 | 58 | (1) | 1 |
| 1 | 59 | (1), (6) | 2 |
| 2 | 60 | (1), (4), (8) | 3 |
| 3 | 61 | (1), (3), (5), (8) | 4 |
| 4 | 62 | (1), (3), (5), (7), (9) | 5 |
| 5 | 63 | (1), (2), (4), (6), (8), (10) | 6 |
| 6 | 64 | (1)–(5), (7), (9), (10) | 7 |
| 7 | 65 | (1)–(4), (6)–(9), (10) | 8 |
| 8 | 66 | (1)–(6), (8)–(10) | 9 |
| 9 | 67 | (1)–(10) | 10 |

The outputs of the gates 58–67 are sent to an OR circuit 68, and then are fed to a reading address determination circuit hereinafter described, delayed by half a period with respect to the clock pulse $P_1$ by the delay circuit 69.

Figure 8:
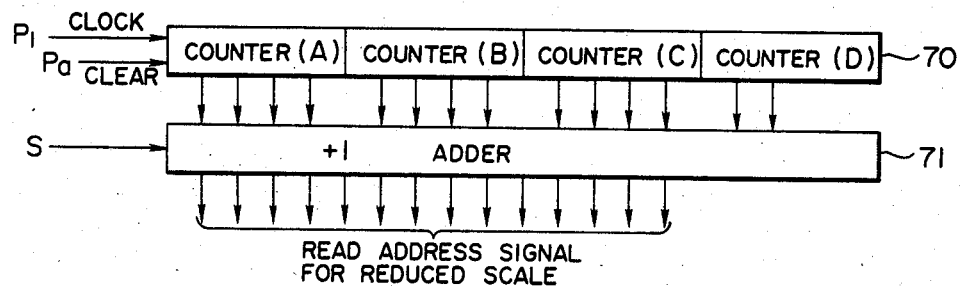
FIGS. 8 and 9 are block diagrams of reading address determination circuits used in the machine of FIG. 2.
Figure 9:
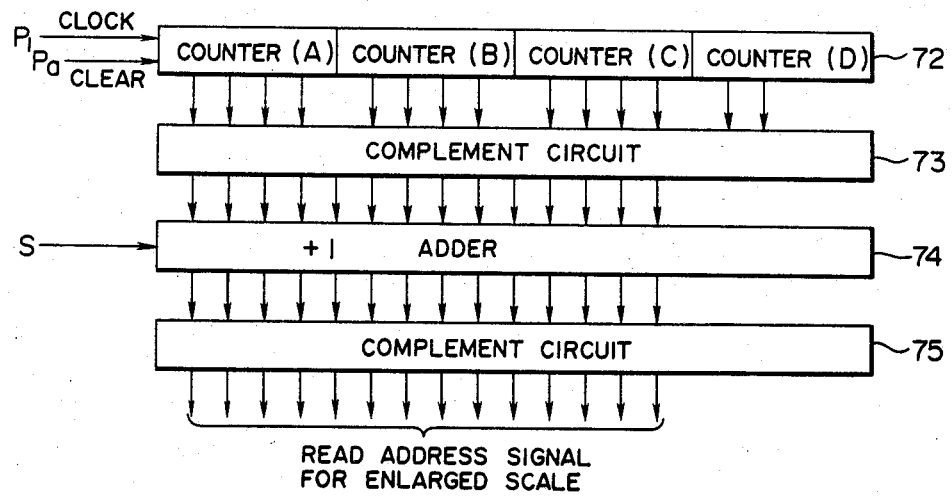

In FIGS. 8 and 9 there are shown reading address determination circuits for reduced and enlarged scales, which are arranged in parallel and are selectively used according to the magnification scale.

In FIG. 8 is shown the reading address determination circuit for reduced scale, comprising a counter 70 having 14 bits and a (+1) adder 71. The counter 70 is composed in practice of four 4-bit counters A–D combined in series. The rotation-synchronization pulse Pa as a clear signal, and the clock pulse $P_1$ as a counting pulse, are input to the counter 70, and the counter 70 outputs a read address signal every clock pulse $P_1$ to the memory 16. If the outputs of the counter 70 are used for the read address signals directly, then the picture signals stored in the memory 16 are read out in the same addressing order as when they were written, and thus same-size reproduction may be obtained.

However, according to the present invention, in the reducing case, the outputs of the counter 70 are fed to the (+1) adder 71, which adds one to the address every time the output signal S from the delay circuit 69 shown in FIG. 6 is input to it. That is, when picture signals at addresses k, k+1, k+2, k+3, . . . are stored in the memory and are being read out, if a signal S is input to the (+1) adder 71 immediately before the value in address k+2 is to be read out, the next address k+3 is addressed, instead of the address k+2. That is, the address k+2, and the value in it, are skipped.

In the case of magnification, the circuit of FIG. 9 is used. This comprises a counter 72 similar to the counter 70 of FIG. 8, a (+1) adder 74 similar to the (+1) adder 71, and two complement circuits positioned before and after the (+1) adder 74. In this case, therefore, when the signal S is present, the address is reduced by 1, instead of being increased by 1. In other words, when picture signals at addresses k, k+1, k+2, k+3, . . . are stored in the memory and are being read out, if a signal S is input to the circuit of FIG. 9 immediately before the value in address k+2 is to be read out, the previous value stored in address k+1 is read out again. That is, repeated reading-out of values in the memory is performed, depending upon the presence of the signal S.

A detailed example of the operation of this method will now be given, with reference to FIG. 1, in which the magnification scales are in one case 0.75, and in the other case 1.33.

In the case of reduced scale of 0.75, on the magnification scale set means 32, m is set to 75. The means 32 calculates n, according the the formula given previously, to be 33.3, and rounds it off to 33. Thus the unit number $n_1$ is 3 and the tens number $n_2$ is 3.

Thus, the gate signal generator 34 sends its output signal to the gate 61 and opens it, thus allowing it to pass the outputs (1), (3), (5), and (8), as described above. Also, the units number 3 is preset to the preset counter 38.

Figure 10:
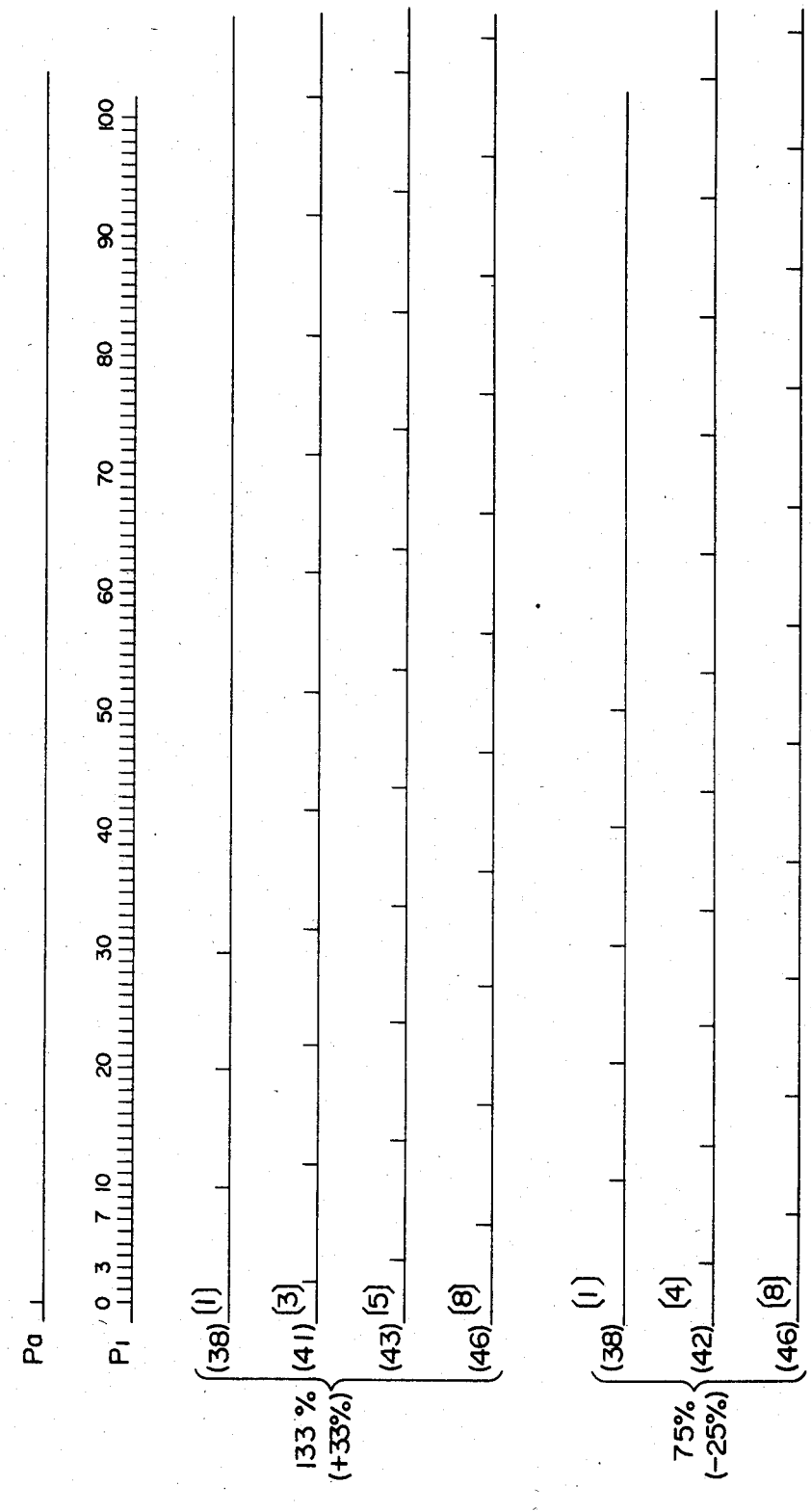
FIG. 10 is a time chart of pulses input into the (+1) adder of FIGS. 8 and 9.

Referring to FIG. 10, the decimal counter 36 of FIG. 6 outputs one signal every ten clock pulses $P_1$ input, starting from the time of the rotation-synchronization pulse Pa. This signal is input to the preset counter 38. The preset counter 38 outputs one output (1) per one input, and when three (the preset number) input signals have been input to the preset counter 38, gate 37 is closed. Hence the output (1) is output at times corresponding to clock pulses number 10, 20, and 30, in each cycle of 100 clock pulses. At the end of each cycle of 100 clock pulses, the entire system is reset by the base 100 counter 39.

The decimal counter 41 is cleared at time 2 $t_1$ after the rotation-synchronization pulse Pa is input to the monostable multi-vibrator 50, as described above. Accordingly, the decimal counter outputs ten signals corresponding to clock pulses numbers 12, 22, 32, . . . 92, 102. In a similar manner the decimal counter 43 outputs ten signals corresponding to clock pulses 14, 24, 34, . . . 94, 104, and the decimal counter 46 outputs ten signals corresponding to clock pulses 17, 27, 37, . . . 97, 107.

Thus the number of pulses passed through the gate 61 is 33: three outputs (1), ten outputs (3), ten outputs (5), and ten outputs (8). This occurs every hundred clock pulses $P_1$. After a hundred pulses $P_1$, the base 100 counter 39 outputs a reset signal to the preset counter 38 to preset again from $n_1=3$. The cycle is again repeated.

These 33 pulses per 100 clock pulses are input to the (+1) adder 71 through the OR circuit 68 and the delay circuit 69, and each of them adds one onto the reading address being used to address the memory, as described above. Therefore 33 addresses are skipped per 100 addresses used, and therefore magnification scale of 100/(100+33)=75% is obtained.

In the case of enlarging, when the magnification factor is 1.33 for example, m is set on the magnification set means 33 to be 133. Therefore, according to the formula explained above, n=25 is obtained, and so the units number $n_2$ is 5 and the tens number $n_1$ is 2.

Hence the gate 60 opens and passes the outputs the outputs (1), (4), and (8), and the units number 5 is preset to the preset counter 38. The outputs (1), (4), and (8) pulse on the following clock pulses:

| Output (1): 10, 20, 30, 40, and 50 | 5 times |
| Output (4): 13, 23, . . . 93, & 103 | 10 times |
| Output (8): 17, 27, . . . 97, & 107 | 10 times |

Thus 25 pulses are passed through the gate 60, per 100 pulses input, and are input to the (+1) adder 74 of FIG. 9 through the OR circuit 68 and the delay circuit 69. Therefore 25 addresses per 100 addresses are read out by addressing repeatedly, and thus a reproduction picture having a magnification of 1.33 times the original picture is obtained.

In the above description the magnification setting is made by setting the integer m on the set means, and n is calculated by the above formulae, resulting in fractions. If these are rounded off, as above, the error in scale is within 1%, and no practical problem arises.

On the machine described above the magnification can be set to any value between 1% and 199%, which is sufficient in practice. When reducing, the greater is the scale factor of shrinking, the more addresses are skipped; but, since in practice the reduced scale factor is rarely less than 40%, this does not present a practical problem, and reproduction quality is maintained within an acceptable level.

In the above description, the maximum magnification of 2 is obtained by reading each memory location twice, but a larger magnification can be obtained by reading each memory location more than twice. For instance, if each location is read three times, a magnification of 3 may be obtained. An intermediate magnification, for instance 2.33, may be obtained by reading some addresses twice and some thrice. In this example, all addresses must be read twice, and then 25 per 100 must be read again, as described above with reference to FIGS. 6-9.

Therefore it will be seen that in order to obtain smooth reproduction magnification or shrinking repeated reading out or skipping of memory addresses is performed repeatedly during the reproduction process, and approximately regularly so that the mean proportion of addresses repeated or skipped is approximately uniform. In cases of integral or reciprocal integral magnification or shrinking, the repeated reading out or skipping of memory locations is performed with a fixed frequency, occurring once per every nth memory location, where n is a fixed integer. In cases of other intermediate magnifications, however, the repeated reading out or skipping of memory locations is performed in a recurring pattern which in itself is not regular, but which recurs once per every nth memory location, where n is a fixed integer, in the cases illustrated above 100. Of course the method is not restricted to patterns of length 100. Further, according to the method used in the machine described above, the scale of the reproduction picture in the direction across the scanning lines is altered by a factor approximately equal to the ratio of the number of addressing signals provided during one line scan, to the total number of memory locations in which digital input signals are stored during the scan, i.e. the magnification. However, a distorted picture could be obtained, if desired, by altering this sidewise magnification, as required.

From the above description it will be seen that according to the present invention a memory of smaller capacity can be used than in prior art methods.

In a conventional machine of this kind which employs a picture cylinder and a recording cylinder which are of the same diameter and rotate at the same speed, the magnification scale is changed by varying the ratio of the scanning sampling pitch between the original picture and the recording film. In this case, since the picture elements sampled of both the original picture and the recording film correspond one to one, when the dimension of the original picture is less than that of the effective circumferential length of the cylinder during enlarging, the memory requires capacity corresponding to the sampling picture elements for recording. However, according to the present invention, since the sampling pitch of the original picture is the same as that of the recording film, when the magnification scale is greater than unity for the enlarging case the capacity of the memory can be saved in proportion to the magnification scale.

Further a reproduction having a reduced magnification scale may be recorded by a memory having a capacity enough to store the picture elements corresponding to a half length of the periphery of the cylinder, by delaying by half a rotation cycle of the cylinder between the writing and the reading start position in the memory.

Figure 11:
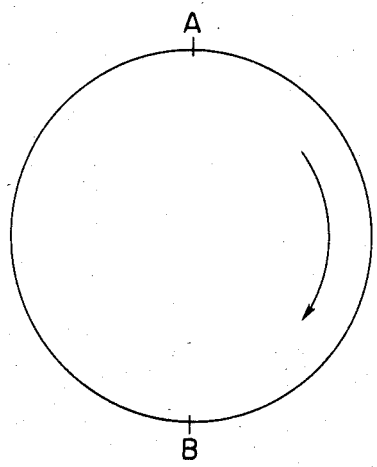
FIG. 11 is a front end view of a cylinder, in which a writing starting point and a reading starting point are shown.

In FIG. 11 there is shown a cylinder in which the reading start point B is delayed by half a rotation cycle of the cylinder from the writing start point A. This is performed by using the rotary encoder shown in FIG. 5, which generates two rotation-synchronization pulses Pa and Pb having phase difference of 180° with respect to one another, every one rotation of the cylinders.

Figure 12:
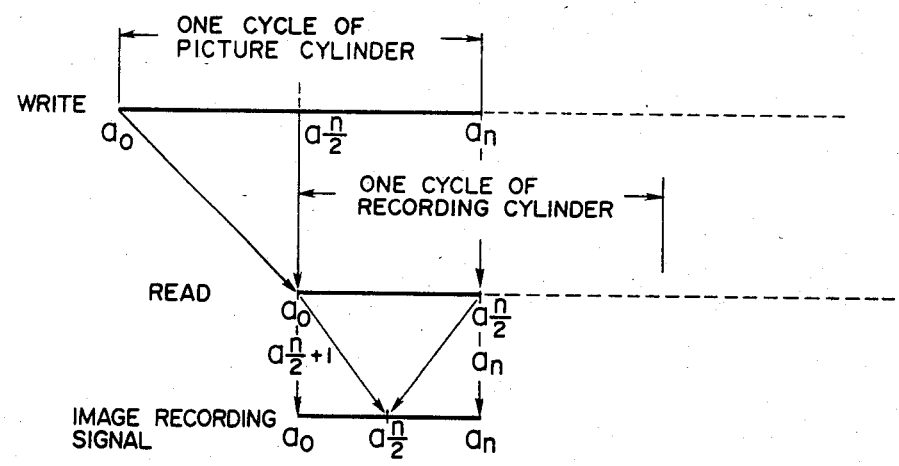
FIG. 12 is a time chart of write and read times of each picture element, in which the write and the read times are shifted half a rotation period, when the magnification scale is $\frac{1}{2}$.

FIG. 12 is a time chart which shows the write and the read times of each picture element when the magnification scale is 0.5. Assuming that the number of sampling picture elements $a_0$-$a_n$ per one rotation cycle of the cylinder is n, the picture elements picked up by scanning the original picture are written into the memory from $a_0$. n/2 picture elements are written until the cylinder has rotated through 180°. Then reading is started from the 180° rotational position of the cylinder, and the picture elements stored in the memory are read out from $a_0$, every second one being skipped.

Therefore, the picture element $a_{n/2+1}$ picked up following the picture element $a_{n/2}$ may be written in the vacant address from which the picture element $a_0$ has just been read out. In similar manner, further writing is made into the vacant addresses whose contents have just been read out. In this case, in order to store and process picture signals from the entire circumference of the cylinder, the capacity required of the memory is that corresponding to half of the entire circumference of the cylinder.

This is a very important feature of the invention, and a very useful one, and it depends on the same sampling pitch on the original picture and the recording film cylinder being used, even when the magnification scale differs from unity.

Referring to FIG. 13, there is shown another embodiment of a picture reproducing machine with variable reproduction scale according to the present invention, in which double solid lines indicate the flow of sampling pulses, and broken lines indicate the flow of control signals for driving motors for the two heads.

The machine of FIG. 13 has the same construction as that of FIG. 2, except for having a memory 16a, a timing controller 19a, a magnification setting controller 20a, a memory write addressing circuit 78, and a memory read addressing circuit 79, instead of the memory 16, the synchronous pulse generator 19, and the magnification addressing circuit 20. The timing controller 19a outputs sampling pulses based on the timing pulses, and the rotation-synchronization pulses generated from the rotary encoder 7.

The picture signals picked up by scanning the original picture are sent to the A/D converter 15, and are converted there into digital picture signals in synchronization with sampling pulses from the timing controller 19a. The digital picture signals are fed to the memory 16a and are stored there in consecutive addresses.

The digital picture signals stored in the memory 16a are read out and are sent to the D/A converter 17 where they are converted into analog picture signals. The analog picture signals are fed to the recording light source driver 18, and control the amount of light of the light source in the recording head 11, thereby recording a reproduction picture onto the recording film attached on the recording cylinder 2.

In FIG. 14 is shown a time chart of the sampling pulses, in which (a) shows the rotation-synchronization pulses from the rotary encoder 7 and T is the rotation period of the cylinder; (b) shows a rotation-synchronization pulse in which the pulse width is elongated; (c) shows a sampling pulse having the period to which samples the picture signals in the A/D converter 15. The sampling pulse having the period $t_0$ may be obtained from the timing pulse from the rotary encoder 7 in the phase lock loop circuit, as described above; (d) is an order sampling pulse having the period $t_0$ for the memory write addressing circuit 78; (e) shows a writing sampling pulse for writing the picture signals from the A/D converter 15 to the memory 16a with addressing by addressing by signals from the memory write addressing circuit 78; (f) shows an order sampling pulse for the memory read addressing circuit 79; (g) is a latch pulse for the memory read addressing circuit 79; (h) is a reading sampling pulse for reading the picture signals stored in the memory 16a by addressing by signals from the memory read addressing circuit 79; and (i) is a clear signal prepared from the rotation-synchronization signal (a).

In FIG. 15, there is shown a block diagram of one embodiment of means for repeating or skipping the addresses of the picture signals read out from the memory 16a by using the sampling pulses as clock pulses.

In FIG. 16 is shown a flow chart of the operations of the means of FIG. 15. In FIG. 15 are shown a magnification setting controller 80 surrounded by a broken line and a memory read addressing circuit 79 of FIG. 13.

A desired magnification scale is set on a preset dial 81 which converts a decimal number into a binary coded decimal (BCD) code. The preset dial 81 having three figures is used so as to obtain 1% as a minimum magnification step, and is set to a decimal number. For example, when the magnification scale is 1.25, "125" is set of the preset dial 81, and when the magnification scale is 0.85, "085" is set. The outputs of the preset dial 81 are sent to a BCD binary number signals. The binary number signals converted are fed to a binary adder 83 and a subtractor 91.

The calculated value output from the binary adder 83 is sent to a digital flip flop 84 which is latched by the clock pulse f and thereafter is sent to an AND circuit 86. The output of the subtractor 91 is sent to a digital flip flop 85 and is thereafter sent to an AND circuit 87.

The clear signal i is input to the AND circuit 86 via an inverter 88 and an OR circuit 89 and is input as the reversed value to the AND circuit 87. The clear signal i is at its low (L) value, as shown in FIG. 14, between the start of one revolution of the cylinder and the time directly after the generation of the first clock pulse f, but is at its high (H) value at other times. Accordingly, the output of the binary adder 83 is input to the AND circuit 86 through the flip flop 84 till the first clock pulse f is generated.

In this period, since the subtractor 92 is cleared by the clear signal i, the other input signal coming to the binary adder 83, i.e. the output z of the subtractor 92 is zero, and thus only the magnification value m from the magnification setting controller 80 is sent to the AND circuit 86 through the binary adder 83 and the flip flop 84.

The output x of the AND circuit 86 is input to the subtractor 92. The output y of the subtractor 91 is fed to the subtractor 92. The output y is the difference between 100 and the magnification value m set in the preset dial 81. When the magnification m is larger than 1, the output y=m−100 is output, and when the magnification m is lesser than 1, the output y=100−m is output from the subtractor 91. When the hundreds digit of the preset dial 81 is any value except 0, the H value m−100 is selected, and when the hundreds digit of the preset dial 81 is zero, the L value 100−m is selected via an inverter 96. The output y is input to a conparator 93.

The subtractor 92 calculates z=y=x from the signals x and y and outputs the signal z. The output signal z is sent to the flip flop 85 and the comparator 93. The comparator 93 calculates u=z−y and output a signal having the H value when u is at least zero, or the L value when u is lesser than zero. The output signal u is fed to an OR circuit 89 and an AND circuit 94.

The latch pulse g is input to the AND circuit 94, and the AND circuit outputs an address conection signal v to the AND circuits 95 and 97. The output of the preset dial 81 when its hundreds unit is the H value is input to the AND circuit 95, and the output of the preset dial 81 when its hundreds unit is the L value is input to the AND circuit 97 via the inverter 96.

The output of the AND circuit 95 is fed to a "DOWN" terminal of a synchronous up-down binary counter 99. The output of the AND circuit 97 is sent to a "UP" terminal of the synchronous up-down binary counter 99 via an OR circuit 98 together with the clock pulse f.

In this case, when the magnification is enlarged or when the magnification is reduced, m/(m−100) or m/(100−m) is calculated. The addresses of the picture signals read out from the memory are repeated or skipped every period corresponding to the above calculated value. The machine of FIG. 15 is adapted to calculate the divisions described above by subtracting repeatedly. From the numerator m is subtracted repeatedly the denominator m−100 or 100−m. The reading address is advanced by one per each subtraction. When the answer is zero or less than zero, the address of the picture signal read out is repeated or skipped.

The operation of the means of FIG. 15 will now be described.

Assuming that the magnification is 1.5 i.e. 150%, the m value 150 is set on the preset dial 81. Since the hundreds number is 1, m−100 is selected in the subtractor 91 for the calculation, and the subtractor 91 outputs the y value 50.

$$m/(m-100=150, (150-100)=3$$

Hence the addresses of the picture signals read out are alternately repeated, i.e. every second one is to be repeated.

First the subtracter 92 is cleared by the clear signal i so that the z value may be zero, and the AND circuit 86 is input by the reverse value H of the clear signal i. Then the m value 150 is passed to the adder 83. Since the z value is zero, the x value 150 is passed to the flip flop 84, and the flip flop 84 is latched when the clock pulse f has the value H.

When the first clock pulse $f_1$ is input to the synchronous up-down binary counter 99, its counter number is increased by one. The x value 150 latched in the flip flop 84 is passed to the subtracter 92 via the AND circuit 86 and the OR circuit 90. The subtracter 92 performs the subraction x−y based on the x value 150 and the y value 50 from the subtracter 91, thereby outputting the z value 100.

The comparator 93 performs the calculation z−y based on the y value 50 and the z value 100, thereby obtaining the output u value 50. The output u value 50 of the comparator 93 is larger than zero and has the L value. The u value 50 is input to the AND circuits 86 and 87 via the OR circuit 89. Hence the AND circuit 86 closes or does not output, and the AND circuit 87 opens or outputs. On the other hand, the z value 100 is passed to the flip flop 85 and is latched when the clock pulse f has the H value.

In this case, since the u value of the comparator 93 has the L value, if the latch pulse g is input to the AND circuit 94, the AND circuit 94 does not output. Consequently, the up-down counter 99 maintains the counter number increased by the first clock pulse $f_1$. Thus, the address of the picture signal read out by the reading clock pulse h is advanced by one. The address advanced by one is now assumed to $S_1$.

When the second clock pulse $f_2$ is input to the flip flop 85, the z value 100 latched is passed to the subtractor 92 via the AND circuit 87 and the OR circuit 90. The subtractor 92 performs x−y and thereby obtaining the z value 50. The z value 50 is sent to the flip flop 85 and the comparator 93.

The comparator 93 calculates z−y and obtain zero value, thereby obtaining the u value having the H value. Thus obtained u value is input to the AND circuit 86 and 87 and opens the AND circuit 86 and closes the AND circuit 87. The v value is also imput to the AND circuit 94. The AND circuit 94 outputs the address correction signal v when the latche pulse g is input thereto.

The address correction signal v is input to the up-down counter 99 via the AND circuit 95 which opens when the hundreds number of the output of the preset dial 81 is at least 1. Then the counter number of the up-down counter 99 is decreased by one, and accordingly the counter number increase in the up-down counter 99 by the second clock pulse f₂ become ineffective. The address of the picture signal with respect to the memory is not advanced, and then the same address as the previous address S₁ is repeatedly read out.

When the third clock pulse f₃ is input to the flip flop 84, the adder 83 performs the addition of the m value 150 and the z value 50, and outputs the x value 200 latched in the flip flop 84 is passed to the subtracter 92. The subtracter 92 performs x−y, thereby outputting the z value 150. In this case, the u value of the comparator 93 has the L value, and the up-down counter 99 maintains the counter number increased by the clock pulse f₃. Thus the following address S₂ of the picture signals in the memory is read out.

Then, when the fourth clock pulse f₄ is input, the x value is 150, which is the same condition as the first clock pulse f₁ is input. Thereafter, the operation described above is repeated.

The operation process described above is tabulated in Table 2, in which the addresses having an odd number are repeatedly read. Thus fifteen sampling picture elements of the reproduction picture are recorded from the ten sampling picture elements of the original picture, thereby obtaining the magnification of 1.5.

Other examples are tabulated in Tables 3–5. In Table 3, the magnification is 1.4 and the addresses $S_2$, $S_4$, $S_7$ and $S_9$ of the addresses $S_1$–$S_{10}$ are repeatedly read out.

In Table 4, the magnification is 2.5, and the addresses having an odd number and the addresses having an even number are repeatedly read out twice and trice, respectively.

In Table 5, the magnification is 0.65, and the addresses $S_1$, $S_4$, $S_7$, $S_{10}$, $S_{13}$, $S_{16}$ and $S_{18}$ of the addresses $S_1$–$S_{20}$ are skipped.

Although the invention has been described in terms of preferred embodiments, various changes and omission in the form and details thereof can be made without departing from the scope of the invention.

For example, the exchangable picture cylinder and the recording cylinder having the different diameters may be used together with a variable magnification set up means, thereby obtaining more wide range of magnification scales.

Further, although the magnification scale value m is set by % and m−100 or 100−m is calculated in the subtracter 91, the standard value n is not restricted to 100, and any optional number may be used. If another number is used instead of 100, the magnification is calculated as follows:

$$m/n = m' \%$$

Therefore, 100 is conveniently used as a standard value n in practice.

TABLE 2

| Clock pulse | x | z (= x − y) | z − y | u | Address read |
|---|---|---|---|---|---|
| Magnification: 1.5 (m = 150, y = m − 100 = 50) | | | | | |
| $f_1$ | 150 | 100 | 50 | L | $S_1$ |
| $f_2$ | 100 | 50 | 0 | H | $S_1$ |
| $f_3$ | 200 | 150 | 100 | L | $S_2$ |
| $f_4$ | 150 | 100 | 50 | L | $S_3$ |
| $f_5$ | 100 | 50 | 0 | H | $S_3$ |
| $f_6$ | 200 | 150 | 100 | L | $S_4$ |
| $f_7$ | 150 | 100 | 50 | L | $S_5$ |
| $f_8$ | 100 | 50 | 0 | H | $S_5$ |
| $f_9$ | 200 | 150 | 100 | L | $S_6$ |
| $f_{10}$ | 150 | 100 | 50 | L | $S_7$ |
| $f_{11}$ | 100 | 50 | 0 | H | $S_7$ |
| $f_{12}$ | 200 | 150 | 100 | L | $S_8$ |
| $f_{13}$ | 150 | 100 | 50 | L | $S_9$ |
| $f_{14}$ | 100 | 50 | 0 | H | $S_9$ |
| $f_{15}$ | 200 | 150 | 100 | L | $S_{10}$ |
| ($f_{16}$) | (150) | (100) | (50) | (L) | ($S_{11}$) |
| . | . | . | . | . | . |
| . | . | . | . | . | . |
| . | . | . | . | . | . |

TABLE 3

| Clock pulse | x | z (= x − y) | z − y | u | Address read |
|---|---|---|---|---|---|
| Magnification: 1.4 (m = 140, y = m − 100 = 40) | | | | | |
| $f_1$ | 140 | 100 | 60 | L | $S_1$ |
| $f_2$ | 100 | 60 | 20 | L | $S_2$ |
| $f_3$ | 60 | 20 | −20 | H | $S_2$ |
| $f_4$ | 160 | 120 | 80 | L | $S_3$ |
| $f_5$ | 120 | 80 | 40 | L | $S_4$ |
| $f_6$ | 80 | 40 | 0 | H | $S_4$ |
| $f_7$ | 180 | 140 | 100 | L | $S_5$ |
| $f_8$ | 140 | 100 | 60 | L | $S_6$ |
| $f_9$ | 100 | 60 | 20 | L | $S_7$ |
| $f_{10}$ | 60 | 20 | −20 | H | $S_7$ |
| $f_{11}$ | 160 | 120 | 80 | L | $S_8$ |
| $f_{12}$ | 120 | 80 | 40 | L | $S_9$ |
| $f_{13}$ | 80 | 40 | 0 | H | $S_9$ |
| $f_{14}$ | 180 | 140 | 100 | L | $S_{10}$ |
| ($f_{15}$) | (140) | (100) | (60) | (L) | ($S_{11}$) |
| . | . | . | . | . | . |
| . | . | . | . | . | . |
| . | . | . | . | . | . |

TABLE 4

| Clock pulse | x | z (= x − y) | z − y | u | Address read |
|---|---|---|---|---|---|
| Magnification: 2.5 (m = 250, y = m − 100 = 150) | | | | | |
| $f_1$ | 250 | 100 | −50 | H | $S_1$ |
| $f_2$ | 350 | 200 | 50 | L | $S_2$ |
| $f_3$ | 200 | 50 | −100 | H | $S_2$ |
| $f_4$ | 300 | 150 | 0 | H | $S_2$ |
| $f_5$ | 400 | 250 | 100 | L | $S_3$ |
| $f_6$ | 250 | 100 | −50 | H | $S_3$ |
| $f_7$ | 350 | 200 | 50 | L | $S_4$ |
| $f_8$ | 200 | 50 | −100 | H | $S_4$ |
| $f_9$ | 300 | 150 | 0 | H | $S_4$ |
| $f_{10}$ | 400 | 250 | 100 | L | $S_5$ |
| $f_{11}$ | 250 | 100 | −50 | H | $S_5$ |
| $f_{12}$ | 350 | 200 | 50 | L | $S_6$ |
| $f_{13}$ | 200 | 50 | −100 | H | $S_6$ |
| $f_{14}$ | 300 | 150 | 0 | H | $S_6$ |
| $f_{15}$ | 400 | 250 | 100 | L | $S_7$ |
| $f_{16}$ | 250 | 100 | −50 | H | $S_7$ |
| $f_{17}$ | 350 | 200 | 50 | L | $S_8$ |
| $f_{18}$ | 200 | 50 | −100 | H | $S_8$ |
| $f_{19}$ | 300 | 150 | 0 | H | $S_8$ |
| ($f_{20}$) | (400) | (250) | (100) | L | ($S_9$) |
| . | . | . | . | . | . |
| . | . | . | . | . | . |

TABLE 5

Magnification: 0.65
(m = 65, y = 100 − m = 35)

| Clock pulse | ⁻x | z (= x − y) | z − y | u | Address read | Address skipped |
|---|---|---|---|---|---|---|
| $f_1$ | 65 | 30 | −5 | H | $S_2$ | $S_1$ |
| $f_2$ | 95 | 60 | 25 | L | $S_3$ | — |
| $f_3$ | 60 | 25 | −10 | H | $S_5$ | $S_4$ |
| $f_4$ | 90 | 55 | 20 | L | $S_6$ | — |
| $f_5$ | 55 | 20 | −15 | H | $S_8$ | $S_7$ |
| $f_6$ | 85 | 50 | 15 | L | $S_9$ | — |
| $f_7$ | 50 | 15 | −20 | H | $S_{11}$ | $S_{10}$ |
| $f_8$ | 80 | 45 | 10 | L | $S_{12}$ | — |
| $f_9$ | 45 | 10 | −25 | H | $S_{14}$ | $S_{13}$ |
| $f_{10}$ | 75 | 40 | 5 | L | $S_{15}$ | — |
| $f_{11}$ | 40 | 5 | −30 | H | $S_{17}$ | $S_{16}$ |
| $f_{12}$ | 70 | 35 | 0 | H | $S_{19}$ | $S_{18}$ |
| $f_{13}$ | 100 | 65 | 30 | L | $S_{20}$ | — |
| $f_{14}$ | (65) | (30) | (−5) | (H) | ($S_{22}$) | ($S_{21}$) |
| . | . | . | . | . | . | . |
| . | . | . | . | . | . | . |
| . | . | . | . | . | . | . |

What we claim is:

1. A picture reproducing method of variable enlargement scale, comprising:

successively scanning linear samples of an original picture to obtain analog input picture signals;

correcting color and tone of the analog input picture signals; converting the analog input picture signals to digital input signals in an analog-digital converter in synchronization with first sampling pulses;

writing the digital input signals into a memory in synchronization with second sampling pulses, into memory locations with consecutively increasing addresses;

reading out the digital input signals stored in the memory as digital output signals in synchronization with third sampling pulses, addressing the successive memory locations by using addressing signals which repeatedly address selected memory locations for at least two periods of said third sampling pulse during each scan so that the values stored in such selected memory location are read out at least twice as digital output signals, such selected memory location being every "n"th memory address where "n" is an integer corresponding to the scale of picture enlargement;

converting the digital output signals into analog output picture signals in a digital-analog converter in synchronization with fourth sampling pulses;

and recording a reproduction of the original picture from the analog output signals, said first, second, third and fourth sampling pulses being provided at the same frequency.

2. A method according to claim 1, wherein the scale of picture enlargement in the direction orthogonal to the linear scanning is altered by a factor approximately equal to the ratio of the number of addressing signals providing during any line scan to the total number of memory locations in which digital input signals are stored during such scan.

3. A picture reproducing machine with variable reproduction scale, comprising:

an original picture cylinder on which an original picture may be mounted;

a pick-up head which successively scans successive linear samples of the original picture and generates analog input picture signals;

pulse generator means for generating sampling pulses during scanning of the original picture by said pick-up head;

an analog-digital converter which converts the analog input picture signals into digital input signals in synchronization with first sampling pulses;

a memory into which the digital input signals are written in successive addresses therein in synchronization with second sampling pulses;

means for reading out the digital input signals stored in the memory in non-decreasing fashion, using addresses provided by addressing signals and in synchronism with third sampling pulses; to thereby produce digital output signals;

a digital-analog converter, into which the digital output signals are fed, and in which they are converted into analog output picture signals in synchronization with fourth sampling pulses, said first, second, third and fourth sampling pulses being at the same fixed frequency;

a recording head which receives said analog output picture signals from said digital-analog converter and which records a reproduction of said original picture onto the recording film; and an address signal generator comprised in said memory read out means and which generates said addressing signals for effecting read-out of the digital output signals from the memory, such address signal generator being adapted to produce address signals which remain the same during at least two sampling pulse periods for every "n" th memory location, whereby the digital input signals stored in such memory locations will be read out at least twice as digital output signals; such address signal generator being further adapted to produce address signals which increase during at least two sampling periods for every "n" th memory location, whereby the input digital signal values in such memory locations will be skipped over and not read out as digital output signals; such memory locations being every "n" th memory address where "n" is an integer corresponding to the picture reproduction scale.

4. A machine according to claim 3, wherein the scale of the reproduction picture in the direction orthogonal to the linear scanning is altered by said address signal generator by a factor approximately equal to the ratio of the number of addressing signals provided during any line scan to the total number of memory locations in which digital input signals are stored during such scan.

5. A picture reproducing method of variable enlargement scale, comprising:

successively scanning successive linear samples of a picture to obtain digital input signals such corresponding to picture samples at a predetermined scanning rate;

storing the digital input signals in a memory at a predetermined sequence of addresses in said memory;

reading out said stored digital input signals from said memory at a rate commensurate with a rate of recording of the picture samples corresponding thereto on a recording medium;

and recording picture samples corresponding to the digital signals read out from said memory upon said recording medium;

said step of reading out the stored digital input signals including addressing said memory with said sequence of addresses modified to include a repetition of every "n" th one of said addresses to accomplish an enlargement of said picture, where "n" is an integer corresponding to the picture enlargement scale.

* * * * *